Feb. 24, 1970  W. D. ALLINGHAM  3,497,377
MIRROR CONFIGURATIONS
Filed Oct. 31, 1966
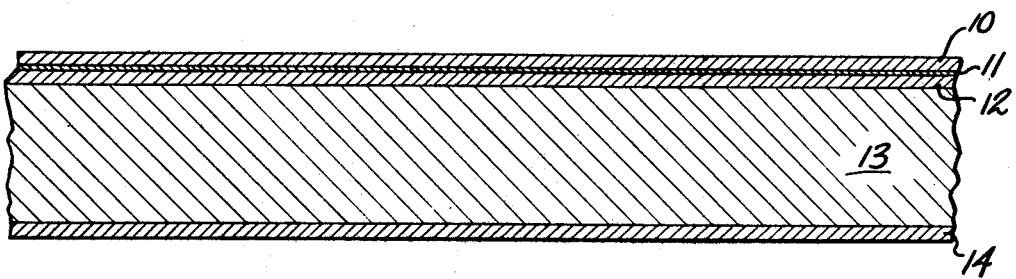
INVENTOR.
WILLIAM D. ALLINGHAM
BY *Sam Laub*
AGENT

United States Patent Office 3,497,377
Patented Feb. 24, 1970

3,497,377
MIRROR CONFIGURATIONS
William D. Allingham, Seattle, Wash., assignor to The Boeing Company, Seattle, Wash., a corporation of Delaware
Filed Oct. 31, 1966, Ser. No. 590,775
Int. Cl. B44d 1/00; G02b 1/10
U.S. Cl. 117—35                          3 Claims

ABSTRACT OF THE DISCLOSURE

An optical reflector or window resistant to erosion and having self-restoring characteristics comprising a thin film of a metal, liquid at the operating temperature, applied to a substrate. A barrier layer may be applied intermediate the liquid metal layer and the substrate to prevent chemical reaction therebetween and a wettable layer may be applied under the liquid metal layer. A thermal layer may be applied to the opposite surface of the substrate to maintain the structure at a specified temperature.

In general this invention relates to an improvement in the reflective surface of mirrors and more particularly to a mirror configuration which has a self-protective surface thereon.

Mirror technology is one of the older arts known to mankind and through the centuries has been perfected from being merely a metallic surface having high polish to a more intricate and complicated structure involving usually a surface such as glass having transparent characteristics with a layer, such as a metallic or amalgam backing to the glass, said backing having typical characteristics of high reflectivity and opaqueness. In mirror technology it has been conventional practice to employ solid materials in the construction of mirrors. However, such solid structures have an inherent drawback; the drawback being that when the mirror surface is subjected to physical contact with moving objects or particles it becomes marred or physically damaged in the area contacted. Such damage spoils both the appearance and reflective characteristics of the mirror. In essence it can be said that the solid structures currently employed in mirror technology do not have the innate property of maintaining a reflective surface after being subjected to external forces causing damage to the mirror.

Reflection from a rough surface occurs in a great many directions from any one direction of the incident beam and is said to be diffuse or scattered. Reflection from a smooth surface takes place along a definite direction determined by the direction of the incident ray. A characteristic of mirrors is a smooth reflecting surface so that the reflectivity is specular, i.e. the reflected ray is oriented in a definite direction. Roughening of a mirror surface by impact from high velocity particles reduces the specular reflectivity of the surface of the mirror.

Therefore, in view of the above-mentioned defect in mirror construction it is an object of the instant invention to produce a mirror construction which has a self-protecting and self-restoring reflective surface film thereon, said surface film having the advantage of being able to maintain unimpaired specular reflective characteristics even when objects hit the mirror surface at high velocities.

It is another object of the instant invention to produce a mirror construction having a surface thereon which exhibits solid characteristics at one temperature and liquid properties at the equilibrium temperature of the mirror surface.

It is another object of the instant invention to produce a mirror which will inherently repair and restore itself after physical damage has been done to the mirror surface.

It is another object of the instant invention to produce a mirror construction, the surface of which is composed of a material having a very low vapor pressure.

It is another object of the instant invention to provide a mirror construction which, when subjected to a space environment, exhibits the function of resisting marring by small meteorites and other traveling media in space.

It is another object of the instant invention to achieve a mirror construction which will have very lightweight characteristics for use upon space vehicles and in other space applications.

Other objects and advantagees of the instant invention will become apparent from the following specification, the appended claims and drawing wherein the mirror construction of the instant invention is shown.

Vehicles and components used in space applications are designed to minimize weight. One problem in the space field has been to obtain a satisfactory, permanently available energy source for use in space. One method of securing such an energy source has been to utilize solar energy by employing a solar energy concentrator. Most solar energy concentrators use a mirror surface to concentrate solar energy by focusing it upon a small area. A mirror in space is subjected to micrometeorites and other materials which impinge with great velocity upon the surface of the mirror. It is readily apparent that such a mirror if of conventional solid construction, would soon lose its reflective properties due to the impingement of these particles.

Another related use for such a mirror would be the collection of energy at locations upon the earth where solar energy could be effectively concentrated and used. Examples of such locations are arctic and desert regions where there is an absence of normal energy sources and transporation of such energy sources has great cost disadvantages. Again it is readily apparent that normal solid construction mirrors would have the disadvantage of soon becoming completely inoperative due to the impingement of sand particles and other wind-borne solids on the mirror surface.

In a broad sense the instant invention is a mirror construction having a self-perpetuating, reflective surface capable of being subjected to impingement by objects while still retaining its reflective characteristics due to a unique surface layer of reflective material that is fusible at a temperature below the maximum temperature to which the mirror surface is subjected. More specifically the instant invention can be described as an improvement in mirror construction whereby the surface of said mirror is coated with a fusible metal or alloy that is liquid at the normal equilibrium temperature of the surface of the mirror. When the mirror surface is so coated, it is less subject to erosion from micrometeoroids or sand particles which, when they impinge upon the mirror surface, normally reduce the reflectivity of the mirror. The particles as they impinge at high speed upon a conventional mirror surface tend to roughen the mirror surface and roughening of the mirror surface results in a reduction in specular reflectivity. The surface tension of the liquid metal-containing layer of the instant invention tends to maintain and restore a smooth reflective surface when subjected to the erosive action of particle impingement because the surface tension of the liquid layer smooths over the roughness caused by particle impingement.

The equilibrium mirror surface temperature in space is determined by distance from the sun, attitude of the surface with respect to the sun, surface absorptivity to solar radiation and the surface emissivity at its equilibrium temperature. If oriented toward the sun, the surface properties of a number of fusible reflective coatings will produce an equilibrium surface temperature above their melting temperature, in particular if the back surface of the mirror is thermally insulated.

Further description of the instant invention can be facilitated by reference to the figure wherein member 13 is the base member of the mirror of the instant invention. The base member 13 could be a homogeneous material, or a material that is reinforced with another material, such as a lightweight honeycomb structure within member 13. However, this is in no sense a limitation because reinforcement could be made by any of the conventional methods of reinforcing a layer structure. Typical surface compositions of member 13 include, but are not limited to, a metal such as aluminum, a high strength organic plastic, or a cermet structure. Attached to member 13, and on backside thereof is layer 14, which could be a thermal insulation or a coating having emissive characteristics selected to radiate the amount of energy necessary to maintain the desired equilibrium temperature of the mirror structure. A typical embodiment of layer 14 would be a polished metallic coating having a low infrared emittance, such as aluminum, silver or gold. On the opposite side of member 13 from that of layer 14 are three additional layers 12, 11 and 10. Layer 12 is an optional barrier layer designed to protect member 13 from corrosion or diffusion by layer 10 should such protection prove necessary. A typical composition of layer 12 is tungsten or tantalum. Adjacent to layer 12, is layer 11 composed of a material that is readily wetted by molten layer 10. Typical compositions of layer 11 would be silver or copper applied to layer 12 by vapor deposition, dipping, electroplating, sintering or other means. The last layer completing the construction of the instant mirror would be layer 10, a fusible reflective coating. This layer would normally be a molten film at the equilibrium temperature of the mirror. The fusible reflective coating adheres to layer 11 and may typically be a film of indium, gallium, mercury, tin or alloys thereof or any of a group of fusible metal alloys containing lead, tin, indium, cadmium or bismuth and combinations thereof. Specific alloys desirable in the practice of this invention are gallium-tin, gallium-zinc, gallium-indium, gallium-aluminum, mercury-indium and mercury-thallium. These materials are intended to be illustrative but not restrictive. The only limitation is that the reflective layer 10 is molten below the maximum operating temperature of the mirror.

For some mirror configurations any, or all, of layers 11, 12 or 14 may be omitted if their function is not required. The mirror would then be, in its simplest form, a base member 13 having thereon a fusible reflective layer 10. If protection of the base member 13 is necessary from any corrosive effects of the fusible layer 10, then an additional layer 12 would be interposed between layers 13 and 10.

Layers 10, 11, 12 and 14 are basically very thin films in comparison to member 13 which provides structural support to the mirror assembly. The thickness of layers 10, 11, 12 and 14 would be of the order of a few thousandths of an inch, and as such it can be seen that these layers, even though of metallic composition in some instances, would not add appreciable weight to any space application for which they would be used. The base layer 13 is of the order of hundredths to tenths of an inch in thickness and when constructed of lightweight materials would provide a lightweight structure.

In the construction of the mirror assembly, it is important that each layer be free of flaws. Also, during construction of the instant mirror it is important to insure that each layer has good adherence with its adjacent layers through practice of proper cleaning techniques. It is apparent that additional comments upon the construction of the instant mirror are not necessary because people skilled in the art of working with materials would realize that various techniques used in construction of the mirror would vary according to the particular components selected for each of the layers.

Particular emphasis and discussion should be made of the properties of the particular metal alloy or material selected to comprise the reflective layer 10 of the mirror construction shown in the attached figure. The properties of immediate interest concerning a material selected to comprise the surface layer 10 would be its surface tension, melting temperature, vapor pressure, wetting characteristics and adhesion to surfaces. Gallium possesses physical properties which make it attractive for this application and these physical properties are set forth in the following table.

TABLE OF GALLIUM PROPERTIES

Atomic weight _____ 69.72
Melting point _____ 85.86° F. at 14.7 p.s.i.a.
Boiling point _____ 3601° F. at 14.7 p.s.i.a.
Density, lb./cu. ft _____ 380.39 at 90° F.

Viscosity (centipoise) _____
$\begin{cases} 1.894 \text{ at } 127.4° \text{ F.} \\ 1.029 \text{ at } 574° \text{ F.} \\ 0.8783 \text{ at } 756° \text{ F.} \\ 0.8113 \text{ at } 932° \text{ F.} \end{cases}$ Thermal conductivity, B.t.u./
 (hr.) (ft.) (° F.) _____ 16.94 to 21.78.
Electrical resistivity,
 (microhm/ft.) _____ 25.9 at 85° F.
Surface tension (poundals) __ 0.1350 at 85° F.
Volume change on fusion ___ −3.32% of sol. vol.
Heat capacity, B.t.u./lb.-° F. _ 0.082.

Vapor pressure (mm. of mercury) _____
$\begin{cases} 1 \times 10^{-3} \text{ at } 1000° \text{ C.} \\ 1 \times 10^{-2} \text{ at } 1140° \text{ C.} \\ 1 \times 10^{-1} \text{ at } 1300° \text{ C.} \\ 1.0 \text{ at } 1500° \text{ C.} \\ 100. \text{ at } 2030° \text{ C.} \end{cases}$ Although gallium has a very low melting temperature, it has a very high boiling temperature. Experimental tests have shown that the evaporation loss of a gallium coating in vacuum is extremely low at temperatures below 800° F. Gallium has excellent wetting characteristics which are attributed to a very thin film of oxide that is usually present on its surface although there is little further oxidation in air or oxygen even at red heat. In addition to being a liquid at moderate temperatures, gallium reflects a high percentage of incident radiation at solar wave lengths which make it particularly suitable as a surface coating for the instant mirror configuration. Although galium has a tendency to attack certain materials at elevated temperatures, it is much less reactive at lower temperatures. A number of suitable substrate materials could be used to protect the base member, such as glass coatings and in particular Pyrex glass coatings, stabilized zirconium oxide, graphite, sintered aluminum oxide, vitreous quartz, tungsten, rhenium, zirconium, columbium, molybdenum and tantalum. One additional point should be made in regard to the cost of gallium which would be a natural objection to its extensive utilization on mirror surfaces. It is stated in a recent article entitled "Gallium" in Industrial and Engineering Chemistry, vol. 56, No. 6, June 1964, pages 54 and 55, that the price of gallium has been declining due to improved refining methods. Gallium base alloys would offer the same or improved properties suitable as constituents for the fusible layer 10.

As already mentioned, typical uses of a mirror configuration as set forth by the instant invention would include a concentrator of solar energy in space applications and in arctic or desert regions. The instant invention would have great utility in such regions because of the longer operating life due to the self-restorative action of the coating against damage from particle impingement. The previous utilizations of the instant invention are not meant to be a comprehensive or complete list, because people working in different fields of technology may recognize a particular need and application of the instant invention.

Another suggested utilization of the instant invention would be the use of a transparent liquid film to provide protection for windows and optical lenses, against the erosive action of micrometeoroids and other small particles. The normal approach to this problem has been to use the devices only intermittently thus exposing them only intermittenly to the action of erosive particles. This is accomplished by the use of protective covers which are removed for short periods of time when the lens or the window is in use. The operation of such protective cover devices, however, requires some form of actuating mechanism which is subject to failure in use. For windows the thickness of the liquid coating would not be critical but could be of some importance if the concept were applied to the protection of optical lenses. The refractive index of the liquid coating should be approximately equal to that of the transparent base structure. A typical embodiment of the window material would be fused silica, lithium fluoride or calcium fluoride, and the liquid coating may typically be a silicone fluid of the methyl polysiloxane group. Another scheme which could be used in practice of the instant invention would be to employ a thin transparent film of low vapor presure and relatively low melting point that is a solid at the normal equilibrium surface temperature of the transparent object on which it is to be used. This film could be applied over a surface of Nesa glass and intermittently heated and melted after surface erosion occurs upon the film so as to form a smooth outer surface and restore optical clarity.

While I have described and illustrated some preferred forms of my invention, it should be understood that many modifications may be made without departing from the spirit and scope of the invention, and it should therefore be understood that this invention is limited only by the scope of the appended claims.

I claim:
1. An optical device possessing an optical surface that is erosion resistant and self restoring, said device comprising
   (a) a substrate
   (b) an optical layer on said substrate, said layer consisting of a liquid metal film having a thickness of a few thousandths of an inch, said liquid film selected from the group consisting of indium, gallium, mercury, tin, and alloys thereof, the outer surface of said liquid film forming an erosion resistant, self restoring optical surface; whereby the surface tension of the outer surface restores the optical characteristics of the optical surface.
2. The optical device as claimed in claim 1 further including a protective barrier layer intermediate said substrate and said optical layer to protect said substrate from chemical reaction with the liquid metal of said optical layer.
3. The optical device as claimed in claim 2 further including a wettable layer intermediate said protective barrier layer and said optical layer, said wettable layer promoting uniform distribution of said optical layer over said barrier layer.

References Cited
UNITED STATES PATENTS

| | | |
|---|---|---|
| 2,450,857 | 10/1948 | Colbert et al. |
| 2,754,238 | 7/1956 | Arenberg. |
| 3,176,679 | 4/1965 | Langley. |

ALFRED L. LEAVITT, Primary Examiner

C. K. WEIFFENBACH, Assistant Examiner

U.S. Cl. X.R.

117—71, 107; 350—288